United States Patent
Chou et al.

(10) Patent No.: US 8,299,934 B2
(45) Date of Patent: Oct. 30, 2012

(54) SHAKE RESPONSIVE MEDIA PLAYER

(75) Inventors: Cheng-Hao Chou, Taipei Hsien (TW);
Te-Yuan Kung, Taipei Hsien (TW);
Wen-Hsiang Lu, Taipei Hsien (TW);
Kuan-Hong Hsieh, Taipei Hsien (TW);
Jui-Lin Ke, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 532 days.

(21) Appl. No.: 12/427,696

(22) Filed: Apr. 21, 2009

(65) Prior Publication Data

US 2010/0013650 A1    Jan. 21, 2010

(30) Foreign Application Priority Data

Jul. 18, 2008  (CN) .......................... 2008 1 0302793

(51) Int. Cl.
*G08B 21/00* (2006.01)
(52) U.S. Cl. .......................................... 340/665; 700/94
(58) Field of Classification Search ................... 340/665; 700/94

See application file for complete search history.

(56) References Cited

U.S. PATENT DOCUMENTS

| | | | |
|---|---|---|---|
| 2004/0118241 A1* | 6/2004 | Niendorf et al. | 74/640 |
| 2006/0253210 A1* | 11/2006 | Rosenberg | 700/94 |
| 2007/0118241 A1* | 5/2007 | Rosenberg | 700/94 |
| 2008/0072676 A1* | 3/2008 | Peng | 73/649 |
| 2008/0147217 A1* | 6/2008 | Chung et al. | 700/94 |
| 2009/0240357 A1* | 9/2009 | Kuo et al. | 700/94 |

* cited by examiner

*Primary Examiner* — George Bugg
*Assistant Examiner* — Ojiako Nwugo
(74) *Attorney, Agent, or Firm* — Altis Law Group, Inc.

(57) ABSTRACT

A shake responsive media player is provided. The media player comprises a vibration switch that changes its state between an electrically open state and an electrically closed state during the media player is shaken. The media player also comprises a storage unit, a motion state determining unit, a media file determining unit, and a processing unit. The storage unit stores a plurality of media files and a table that defines relationships between shaking levels and the sampling rates of the at least one group of media files. The motion state determining unit determines a duration of the shaking of the media player and the times of state changing of the vibration switch according to signals from the vibration switch and determines a shaking level according to the duration of the shaking of the media player and the times of state changing of the vibration switch.

1 Claim, 5 Drawing Sheets

| Number of times of state changing of the vibration switch per unit time period (times/sec) | Shaking level | Sampling rates (kHz) |
|---|---|---|
| 1-3 | 1 | 32 |
| 3-6 | 2 | 22 |
| 6-8 | 3 | 11 |
| 8-10 | 4 | 8 |

SHAKE RESPONSIVE MEDIA PLAYER

RELATED APPLICATIONS

This application is related to U.S. patent application Ser. No. 12/427,699 and a title of SHAKE RESPONSIVE MEDIA PLAYER, which has the same assignee as the current application and has been concurrently filed.

BACKGROUND

1. Technical Field

The present disclosure relates to a media player, and more particularly to a shake responsive media player.

2. Description of Related Art

Electronic Media Players have become popular personal entertainment devices due to their highly portable nature. Many portable electronic devices such as cellular telephones and personal digital assistants (PDAs) include the ability to play electronic music media in many of the most commonly available file formats including MP3, AVI, WAV, MPG, QT, WMA, AIFF, AU, RAM, RA, MOV, MIDI, etc.

The portable media players of the relevant art enable users to listen to music as digital audio files and/or as part of digital video files, selecting media items from memory and playing the media files such that the audio content can be listened to through headphones or speakers. Such listening activities however are entirely passive, relegating the user to being a listener of the music content but do not provide more fun to the users. Therefore, there is a need to provide a media player that can provide more fun to the users.

BRIEF DESCRIPTION OF THE DRAWINGS

FIG. 2 shows a relationship table in accordance with an exemplary embodiment that is stored in the storage unit of the media player of FIG. 1.

DETAILED DESCRIPTION

Figure 1:
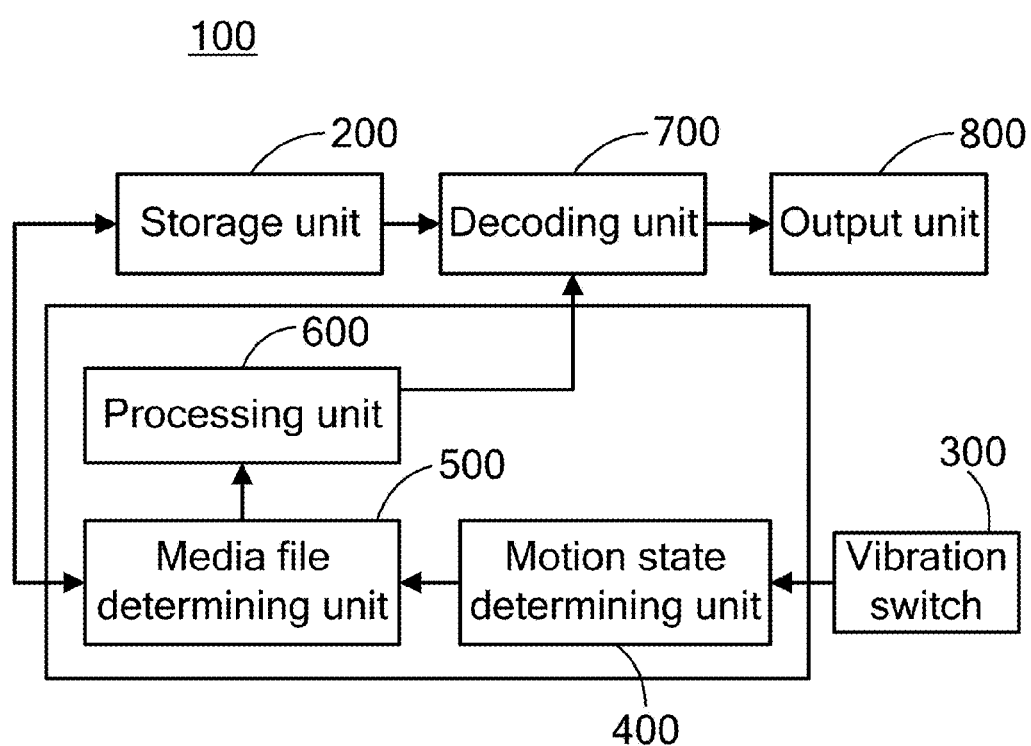
FIG. 1 is a block diagram of the media player in accordance with an exemplary embodiment of the present disclosure.

FIG. 1 shows a block diagram of a media player 100 in accordance with an exemplary embodiment of the present disclosure. The media player 100 includes a storage unit 200, a vibration switch 300, a motion state determining unit 400, a media file determining unit 500, a processing unit 600, a decoding unit 700, and an output unit 800.

The storage unit 200 stores at least one group of audio files, such as MP3 type music files. The at least one group of audio files are associated with each other, for example, each of the audio files has a common prefix in their file names, such as song 1_1.mp3, song 1_2.mp3, song 1_3.mp3 and etc.

Each of the files in one group has the same content, such as the same song, but at different sampling rates. An original audio file is first obtained and then a plurality of audio files can be created using a sampling rate conversion tool that is capable of converting the sampling rate of the original audio file to any of several different values.

In the present embodiment, the at least one group of media files have sampling rates ranging from 32 kHz to 8 kHz. At different sampling rates, the audio files differ in their sound quality when being played back. Listeners may prefer different sampling rates at different times according to their moods or the kind of file being played for example. By providing easily selectable sampling rates another dimension of entertainment is provided to users.

Referring to FIG. 2, the storage unit 200 also stores a table which defines a relationship between shaking levels of the media player 100 and the sampling rates of the at least one group of media files. The shaking level is a parameter indicating how strongly the media player 100 is shaken, that is, the more strongly the media player 100 is shaken, the higher the shaking level is. Each of the shaking level corresponds to one of the sampling rates of the at least one group of audio files. In this embodiment, the higher the shaking level, the lower the corresponding sampling rate. The table also defines the relationship between the number of times of state changing of the vibration switch 300 per unit time period and the shaking levels, which will be better understood after the description of the vibration switch 300.

Figure 3:
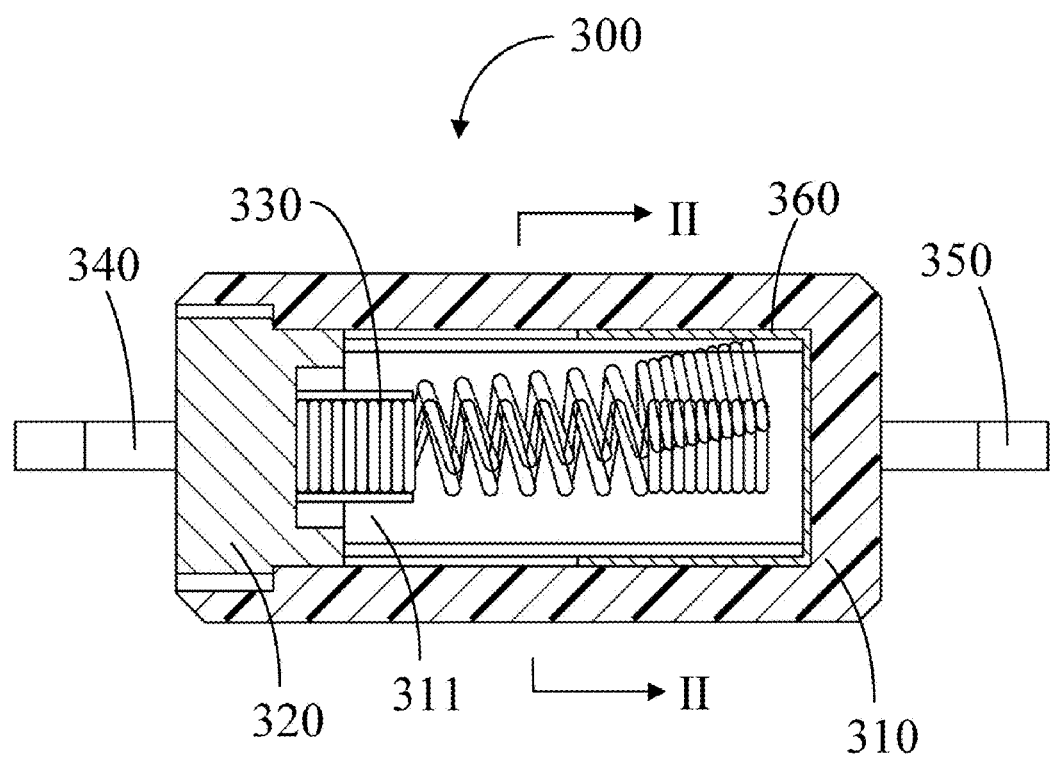
FIG. 3 is an assembled, cross-sectional view of the vibration switch of FIG. 1 in accordance with an exemplary embodiment of the present disclosure.
Figure 4:
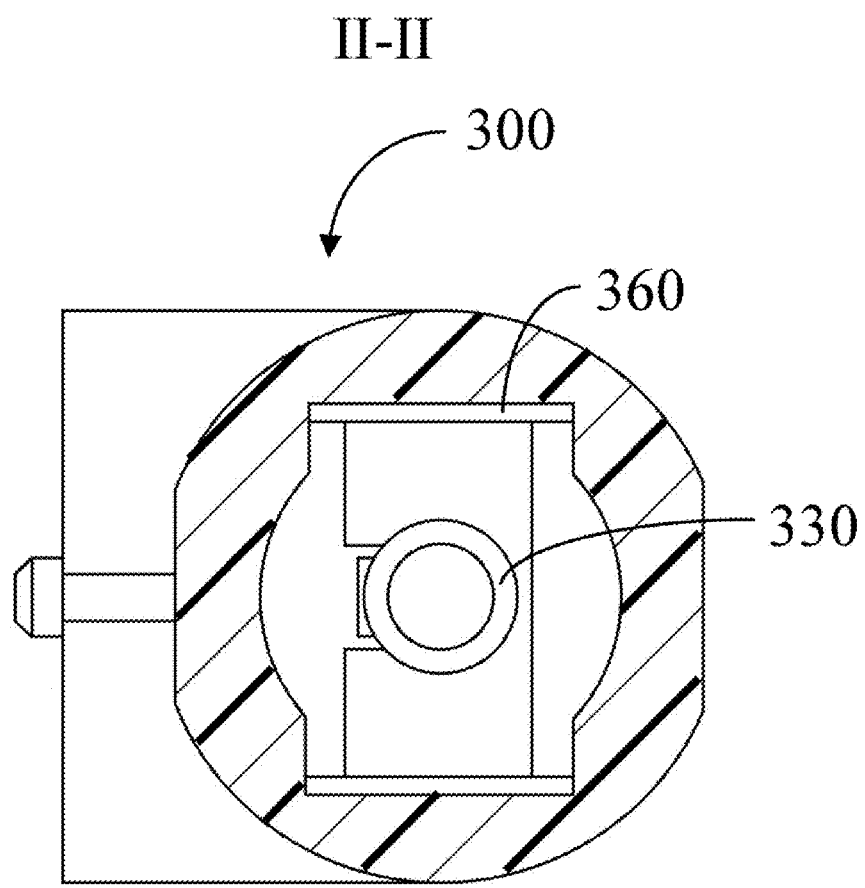
FIG. 4 is an assembled, cross-sectional view of the vibration switch of FIG. 1, taken along the line II-II in FIG. 3.

Referring to FIGS. 3 and 4, in one embodiment, the vibration switch 300 comprises a housing 310, a side cap 320, a coil spring 330, a first contact terminal 340, a second contact terminal 350, and a metal sheet 360.

A chamber 311 is formed in the housing 310. The side cap 320 is attached to the opening end of the housing 310 to cover the chamber 311. The coil spring 330 is received in the chamber 311 in a cantilevered way, that is, one end the coil spring 330 is attached to the side cap 320 and is electrically coupled with the first contact terminal 340, while the other end of the coil spring 330 is suspended in the chamber 311.

The metal sheet 360 is flat and positioned on the inner surface of the chamber 311. The metal sheet 360 is electrically coupled with the second contact terminal 350. When the vibration switch 300 is shaken in a predetermined direction, the vibration switch 300 keeps changing its state between an electrically closed state and an electrically open state. More specifically, when the housing 310 is shaken in a direction approximately perpendicular to the metal sheet 360, the coil spring 330 deflects and is capable of contacting the metal sheet 360. After the shaking of the housing 310 has ceased, the coil spring 330 returns to its original shape and position and the vibration switch 300 returns to the electrically closed state.

Figure 5:
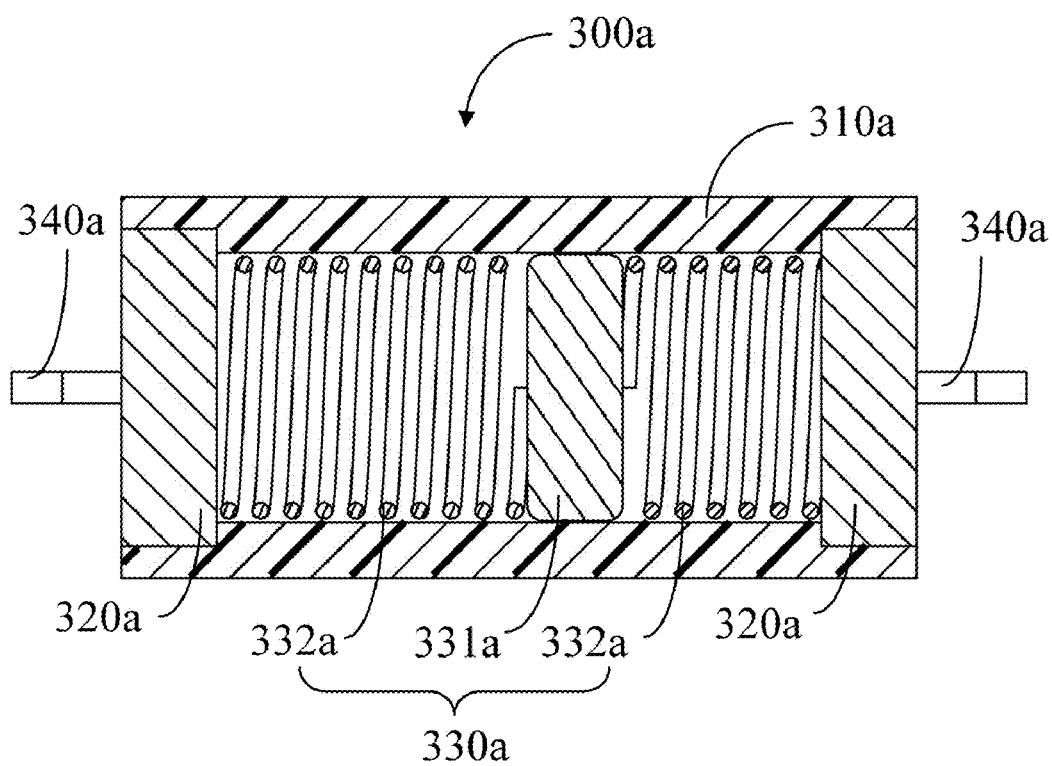
FIG. 5 is an assembled, cross-sectional view of the vibration switch of FIG. 1 in accordance with another exemplary embodiment of the present disclosure.

Referring to FIG. 5, in another embodiment, the vibration switch 300a includes a housing 310a, two side caps 320a, a movable member 330a, and two contact terminals 340a. A chamber 311a is formed in the housing 310a. The two side caps 320a are attached to two ends of the housing 310a respectively to cover the chamber 311a, and are electrically coupled to the two contact terminals 340a, respectively.

The movable member 330a comprises an inertial weight 331a and two coil springs 332a. The coil springs 332a are attached to two ends of the inertial weight 331a respectively and are in contact with the two side caps 320a. When the housing 310a is shaken in a longitudinal direction, the inertial weight 331a moves in the chamber 311a and one of the two coil springs 332a is capable of being out of contact with one of the two side caps 320a, making the vibration switch 300a change from an electrically open state to an electrically closed state.

The motion state determining unit 400 detects signals from the vibration switch 300 in a unit time period, such that the shaking level of the shaking of the media player 100 can be monitored according to the number of times of state changing of the vibration switch 300 in the unit period. In this embodiment, as shown in FIG. 2, the relationship between the shaking level and the number of times of state changing of the vibration switch 300 is defined in the table.

When the media player 100 is being shaken and one of the at least one group of audio files is playing, the media file determining unit 500 receives signals from the motion state determining unit 400 and determines a sampling rate that corresponds to the shaking level determined by the motion state determining unit 400. The audio file of the current group of audio files from which the current audio file is being played that has the sampling rate determined by the audio file determining unit 500 then becomes the selected audio file.

The processing unit 600 receives signals from the media file determining unit 500 and plays the selected audio file determined by the media file determining unit 500. The selected audio file is played from the location where the previous audio file left off. Specifically, for example, a previous audio file A has been playing for 120 seconds, and a selected audio file B determined by the media file determining unit 500 is then played the point 120 seconds into the file and continues playing the selected audio file B until the shaking level determined by the audio file determining unit changes. As a result, during the shaking of the media player 100, a user can experience content of an audio file at different sampling rates.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A shake responsive media player comprising:
a vibration switch changing its state between an electrically open state and an electrically closed state during a shaking of the media player;
a storage unit storing at least one group of media files associated with each other having the same contents and different sampling rates and a table defining a relationship between shaking levels of the shaking of the media player and the sampling rates of the at least one group of media files, the shaking levels indicating how strongly the media player is being shaken;
a motion state determining unit determining the number of times of state changing of the vibration switch in a unit time period to monitor the shaking levels of the shaking of the media player according to signals from the vibration switch;
a media file determining unit, wherein when a first media file of the at least one group of media files is playing, the media file determining unit determines a second media file associated with the first media file, the second media file having a sampling rate corresponding to the shaking level determined by the motion state determining unit according to the table; and
a processing unit playing the second media file until the shaking level determined by the motion state determining unit changes;
wherein the vibration switch comprises a chamber, a moveable member, and two contact terminals, the moveable member is received in the chamber and comprises an inertial weight and two coil springs, the two coil springs contact the first contact terminal and the second contact terminal respectively, and the two coil springs are respectively attached to opposite sides of the inertial weight, allowing the inertial weight to compress one of the two coil springs and pull the other one of the two coil springs, thereby enabling at least one of the two coil springs to disengage from the corresponding one of the two contact terminals during the shaking of the media player, which changes the motion sensing unit between an electrically closed state and an electrically open state.

* * * * *